Feb. 6, 1934.　　　　F. E. LOUDY　　　　1,946,408
FUSELAGE JOINT
Filed Aug. 21, 1930　　2 Sheets-Sheet 1
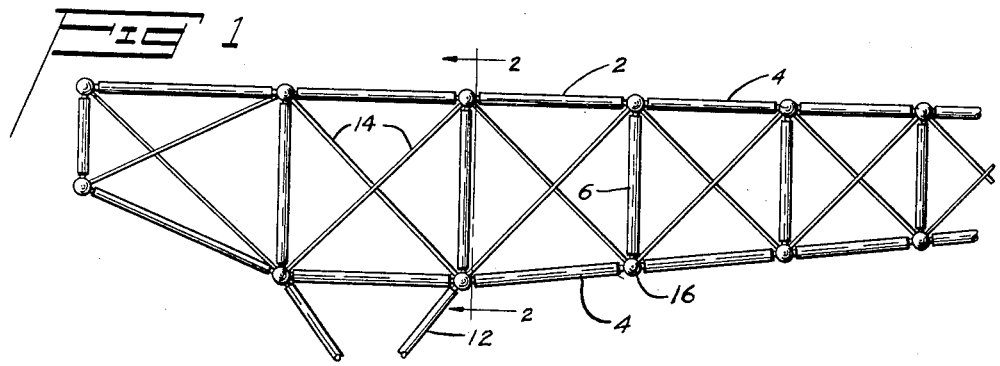
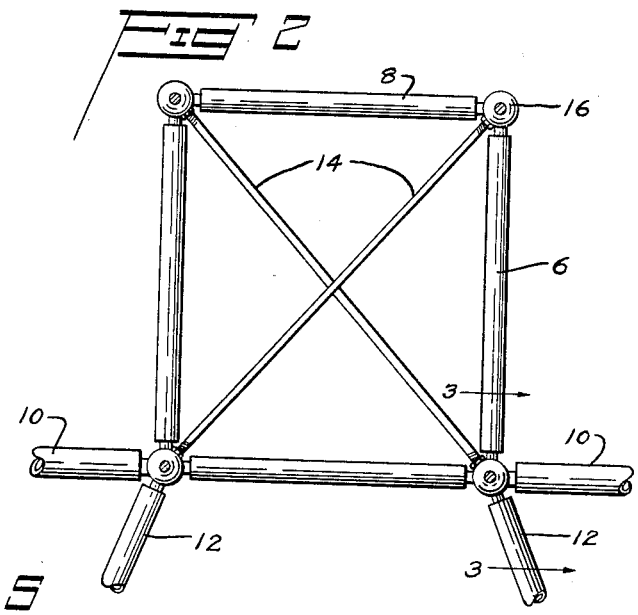
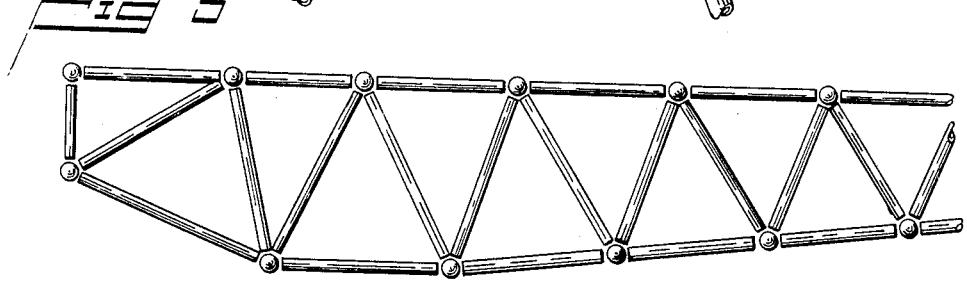
INVENTOR
Flavius E. Loudy
BY
ATTORNEY Feb. 6, 1934.    F. E. LOUDY    1,946,408
FUSELAGE JOINT
Filed Aug. 21, 1930    2 Sheets-Sheet 2
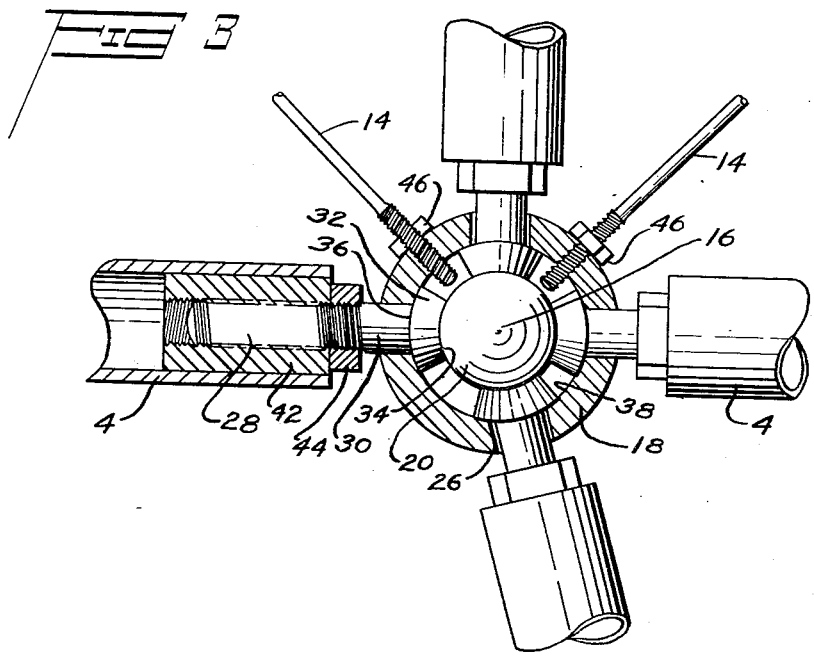
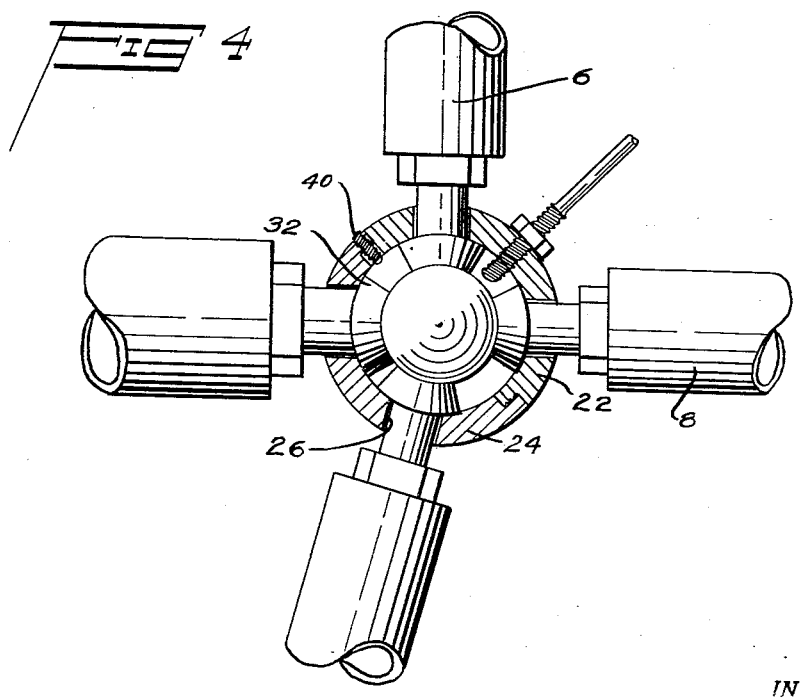
INVENTOR
Flavius E Loudy
BY
ATTORNEY Patented Feb. 6, 1934

1,946,408

UNITED STATES PATENT OFFICE 1,946,408

FUSELAGE JOINT

Flavius E. Loudy, Akron, Ohio

Application August 21, 1930. Serial No. 476,911

10 Claims. (Cl. 189—36)

This invention relates to improvements in aircraft structure, more particularly to a novel type of connection that is especially adapted for interconnecting the compression and/or tension elements of a fuselage hull structure of a rigid airship, or any other structure where the angularity of the structural elements relative to one another produces a complicated joint.

My invention has for its primary object to provide a novel joint for interconnecting at their intersection points two or more structural elements angularly disposed relative to each other and in different planes, whereby compression or tension loads are transmitted from one element to another through two separate members of said connection, which in themselves constitute a compression element and a tension element respectively.

A further object of my invention is to provide a fitting of this character which will be simple in construction so that rapid assembly and disassembly of the various structural elements can be obtained.

Other objects and advantages of the invention will be apparent during the course of the following description.

In the accompanying drawings forming a part of this specification and in which like numerals are employed to designate like parts throughout the same:

Fig. 1 shows a side elevation of a portion of a fuselage structure in which my invention is adapted to a Pratt type truss having compression and tension elements.

Fig. 2 is a cross section view taken on the line 2—2 of Fig. 1.

Fig. 3 is an enlarged detail view taken on the line 3—3 of Fig. 2, showing my novel joint adapted to the Pratt type truss with parts broken away and in section.

Fig. 4 is an enlarged detail sectional view of the lower left hand joint in Fig. 2.

Fig. 5 is a side elevation view of a fuselage having my invention adapted to a Warren truss type of construction.

In the drawings, wherein for the purpose of illustration I have shown the preferred embodiment of my invention, the numeral 2 designates a fuselage construction having compression and tension members which consist of longérons 4, strut members 6, cross braces 8, wing spars 10, chassis strut members 12, and tie rods 14, all of which members are interconnected at their intersection points by fittings 16 spaced throughout the length of the fuselage.

The fitting 16 comprises a spherical casing 18 and a ball 20 enclosed thereby. This casing is constructed of two semi-spherical halves 22 and 24, that are secured together by providing the one half with an external thread and the other with an internal thread, each half having openings 26 to receive the terminals 28 and provide with the shaft or shank 30 thereof a loose or tight fit depending of course upon the type of member to be secured to the terminal.

Each terminal is provided with a head 32 having an inner concaved face 34 and an outer convexed face 36. The inner face 34 constitutes a socket for the ball 20 when the fitting is assembled, whereas the outer face 36 cooperates with the inner wall 38 of the casing 18 to provide a further ball and socket joint. To prevent accidental unscrewing of the two semi-spherical members 22 and 24 a set screw 40 is passed through the threaded portion and at right angles thereto. Appropriate adjusting means of any known kind can be adapted for securing the tension and compression elements to their respective terminals.

In the arrangement shown in Fig. 3 the means for connecting the longeron 4 to the terminal 28 consists of a threaded filler 42 brazed on the open end of the longeron for receiving the threaded end of the terminal. A locknut 44 is provided on the threaded end of the terminal for locking the same to the longeron.

It will thus be seen from the above description that when the longeron or any one of the compression and tension elements is in compression the ball and socket joint consists of the ball 20 and the inner face 34 of the terminal 28 and compression is transmitted from one longeron to the opposite longeron through terminal and ball. When, however, the longeron is in tension then the outer face 36 of the terminal constitutes a ball and the inner wall of the casing a socket.

While the tie rods 14 are also interconnected at their points of intersection by the fittings 16 they are not necessarily connected thereto in a manner as above described. Since these tie rods serve merely as tension members, it is only necessary that they be secured either to the spherical casing 18 or to the ball 20 directly. As illustrated in Figs. 3 and 4 of the drawings the end of tie rod is threaded into the casing 20 and is finally secured against longitudinal movement by means of the locknut 46.

It will also be apparent that when, as illustrated in Fig. 4, tension occurs in the tie rod 14 then compression is produced in the strut 6 and brace 8 through the casing 18, terminals 28 opposite to the tie rod, through the ball 20 and thence to the strut and brace members.

As previously stated if freedom of movement is desired at the joint, then the diameter of the holes 26 in the casing are made larger than the shaft or shank of the terminal. On the other hand, if maximum end fixity is required, then the diameter of the opening and the diameter of the shank are made identical. It will, of course, be understood that the fittings in either the Pratt or Warren truss arrangement must be held in position. The tie rods in Fig. 3 serve this purpose, whereas in the Warren truss arrangement Fig. 5, one of the terminals is held rigid with the casing.

It is to be understood that the form of my invention herewith shown and described is to be taken as a preferred example of the same, and that certain changes in the shape, size, and arrangement of parts may be resorted to without departing from the spirit of the invention or the scope of the subjoined claims.

Having thus fully described my invention, what I claim is:—

1. In a joint coupling, a floatingly supported spherical shell member adapted for universal movement having a plurality of openings, a ball in said shell member having a diameter less than inside diameter of said shell, a member extending into each of said openings, and a head member on the inner end of each said last mentioned members having an inner concaved face for engagement with said ball and an outer convexed face for engagement with the inner side of the shell member.

2. In a joint coupling, two semi-spherical shell members each having an opening, means for securing said semi-spherical shell members together to form a spherical shell member adapted to be floatingly supported, a ball in said shell member having a diameter less than the inside diameter of said shell member, a member extending into each of said openings, and a head member on the inner end of each of said last mentioned members having an inner concaved face for engagement with said ball and an outer convexed face for engagement with the inner side of the semi-spherical shell member to which it is secured.

3. In a joint coupling, two semi-spherical shell members, each having a plurality of openings, means for securing said semi-spherical shell members together to form a spherical shell member adapted to be floatingly supported, a ball in said shell member having a diameter less than the inside diameter of said shell member, a member extending into each of said openings, and a head member on the inner end of each of said last mentioned members having an inner concaved face for engagement with said ball and an outer convexed face for engagement with the inner side of the semi-spherical shell member to which it is secured.

4. In a joint coupling, two semi-spherical shell members each having an opening and threaded together to form a spherical shell member adapted to be floatingly supported, a ball in said spherical shell member having a diameter much less than the inside diameter of said shell member, a member extending into each of said openings, and a head member on the inner end of each of said last mentioned members having an inner concaved face for engagement with said ball and an outer convexed face for engagement with the inner side of the semi-spherical shell member to which it is secured.

5. In a joint coupling, two semi-spherical shell members each having an opening and capable of being threaded to each other for forming a spherical shell member adapted to be floatingly supported, means for preventing the accidental unscrewing of said two semi-spherical shell members from each other, a ball in said completed spherical shell member having a diameter less than the inside diameter of said shell member, a member extending into each of said openings, and a head member on the inner end of each of said last mentioned members having an inner concaved face for engagement with said ball and an outer convexed face for engagement with the inner side of the semi-spherical shell member to which it is secured.

6. In a joint coupling, a floatingly supported spherical shell member having a plurality of vertical openings and a plurality of horizontal openings, a ball in said shell member having a diameter less than the inside diameter of said shell member, a member extending into each of said openings and a head member on the inner end of each said last mentioned members, positioned by the said ball and inner wall of the said shell member.

7. In a joint coupling, a floatingly supported spherical shell member having a vertically extending opening and a horizontally extending opening, a ball in said shell member having a diameter less than the inside diameter of said shell member, a member extending into each of said openings and a head member on the inner end of each said last mentioned members, positioned by the said ball and inner wall of the said shell member.

8. In a joint coupling, a floatingly supported spherical shell member having a plurality of openings, a ball in said shell member having a diameter less than the inside diameter of said shell member, a member extending into each of said openings, a head member on the inner end of each of said last mentioned members having an inner concaved face for engagement with said ball and an outer convexed face for engagement with the inner side of said shell member, a sleeve threaded onto the outer end portion of each of said members, a tube member rigidly secured to each of said sleeves, and a lock nut threaded on to each of said members that extend into said openings capable of being tightened to frictional engagements with said sleeve members.

9. In a joint coupling, a floatingly supported spherical shell member having a plurality of openings, a ball in said shell member having a diameter less than the inside diameter of said shell member, a member extending into each of said openings, a head member on the inner end of each of said last mentioned members having an inner concaved face for engagement with said ball and an outer convexed face for engagement with the inner said shell member, and a tie rod rigidly secured to said shell member for holding said shell member to one direction.

10. In a joint coupling, a floatingly supported spherical shell member having a plurality of openings, a ball in said shell member having a diameter less than the inside diameter of said shell member, a member extending into each of said openings, a head member on the inner end of each of said last mentioned members having an inner concaved face for engagement with said ball and an outer convexed face for engagement with the inner said shell member, and a plurality of tie rods adjustably secured to said shell member.

FLAVIUS E. LOUDY.